US008045576B2

(12) United States Patent
Tsfaty et al.

(10) Patent No.: US 8,045,576 B2
(45) Date of Patent: Oct. 25, 2011

(54) METHODS AND APPARATUS TO MANAGE POWER CONSUMPTION IN WIRELESS LOCAL AREA NETWORK DEVICES

(75) Inventors: Yossi Tsfaty, Rishon Le Zion (IL); Avraham Baum, Givat-Shmuel (IL); Artur Zaks, Modiin (IL)

(73) Assignee: Texas Instruments Incorporated, Dallas, TX (US)

( * ) Notice: Subject to any disclaimer, the term of this patent is extended or adjusted under 35 U.S.C. 154(b) by 114 days.

(21) Appl. No.: 12/251,079

(22) Filed: Oct. 14, 2008

(65) Prior Publication Data

US 2010/0091657 A1   Apr. 15, 2010

(51) Int. Cl.
*H04L 12/43* (2006.01)
(52) U.S. Cl. ........ 370/458; 370/329; 370/338; 370/341; 370/346
(58) Field of Classification Search .................. 370/241, 370/338, 350, 329, 311, 341, 346, 330, 458
See application file for complete search history.

(56) References Cited

U.S. PATENT DOCUMENTS

| | | | | |
|---|---|---|---|---|
| 6,968,194 B2* | 11/2005 | Aljadeff et al. | ............ | 455/456.1 |
| 6,973,053 B1* | 12/2005 | Passman et al. | ............ | 370/310 |
| 7,146,130 B2* | 12/2006 | Hsu et al. | ............ | 455/3.04 |
| 7,222,175 B2* | 5/2007 | Knauerhase et al. | ......... | 709/225 |
| 7,224,970 B2* | 5/2007 | Smith et al. | ............ | 455/434 |
| 7,333,460 B2* | 2/2008 | Vaisanen et al. | ............ | 370/338 |
| 7,567,815 B2* | 7/2009 | Nishikawa et al. | ............ | 455/502 |
| 7,583,643 B2* | 9/2009 | Smith et al. | ............ | 370/338 |
| 7,848,271 B2* | 12/2010 | Salomone et al. | ............ | 370/311 |
| 2004/0127240 A1* | 7/2004 | Li | ............ | 455/500 |
| 2005/0143145 A1* | 6/2005 | Maekawa | ............ | 455/574 |
| 2005/0195772 A1* | 9/2005 | Nishikawa et al. | ............ | 370/337 |
| 2006/0268756 A1* | 11/2006 | Wang et al. | ............ | 370/310 |
| 2006/0270438 A1* | 11/2006 | Choi | ............ | 455/522 |
| 2009/0036151 A1* | 2/2009 | Kanda | ............ | 455/501 |
| 2009/0147768 A1* | 6/2009 | Ji et al. | ............ | 370/350 |

\* cited by examiner

*Primary Examiner* — Gary Mui
*Assistant Examiner* — Dewanda Samuel
(74) *Attorney, Agent, or Firm* — Ronald O. Neerings; Wade James Brady, III; Frederick J. Telecky, Jr.

(57) ABSTRACT

Methods and apparatus to manage power consumption in wireless devices are disclosed. A disclosed example apparatus comprises performing a first received signal strength indicator (RSSI) scan to determine a beacon interval and a first beacon time for a wireless channel, calculating a second beacon time for the wireless channel based on the beacon interval and the first beacon time, and performing a second RSSI scan for the wireless channel during a time interval that includes the calculated second beacon time. In some examples, the wireless channel is a wireless channel that was previously identified as active, is a wireless channel that previously had the highest received power level, and/or is selected from a list of popular or frequently used channels. Additionally or alternatively, when a wireless channel with sufficient signal level is identified, scanning for additional channels is not performed.

20 Claims, 4 Drawing Sheets

US 8,045,576 B2

METHODS AND APPARATUS TO MANAGE POWER CONSUMPTION IN WIRELESS LOCAL AREA NETWORK DEVICES

FIELD OF THE DISCLOSURE

This disclosure relates generally to wireless devices and, more particularly, to methods and apparatus to manage power consumption in wireless local area network (WLAN) devices.

BACKGROUND

WLAN devices periodically or aperiodically perform received signal strength indicator (RSSI) scans in an attempt to maintain communicative coupling with at least one access point. RSSI scans are often used by a WLAN device in an enterprise environment to locate and/or identify the access point that provides preferable communication conditions for the WLAN device. Additionally or alternatively, RSSI scanning is performed to determine the location of a WLAN device. For example, the RSSI values associated with one or more nearby access points may be used to determine and/or estimate the location of a WLAN device. An example WLAN device is implemented in accordance with the Institute of Electrical and Electronics Engineers (IEEE) 802.11x family of standards (a.k.a. WiFi).

DETAILED DESCRIPTION

Example methods and apparatus to manage power consumption in wireless devices are disclosed. A disclosed example method includes performing a first received signal strength indicator (RSSI) scan to determine a beacon interval and a first beacon time for a wireless channel, calculating a second beacon time for the wireless channel based on the beacon interval and the first beacon time, and performing a second RSSI scan for the wireless channel during a time interval that includes the calculated second beacon time.

A disclosed example apparatus includes a wireless receiver to perform RSSI scans, a receiver controller to enable the wireless receiver during a first time interval to perform a first RSSI scan for a wireless channel to determine a beacon interval and a first beacon time for the wireless channel, and to enable the wireless receiver during a second time interval that includes a calculated second beacon time to perform a second RSSI scan for the wireless channel to determine an RSSI value associated with the wireless channel, and a beacon time calculator to calculate the second beacon time based on the first beacon time and the beacon interval.

Another disclosed example method includes performing a first set of RSSI scans to determine a set of RSSI values for respective ones of a first set of wireless channels during a first time interval, the first set of wireless channels selected from a plurality of possible wireless channels based on frequency of use, and comparing the set of RSSI values to a threshold to determine whether to perform a second set of RSSI scans for respective ones of a second set of wireless channels during a second time interval, the second set of wireless channels selected from the plurality of possible wireless channels to be different from the first set of wireless channels.

Figure 1:
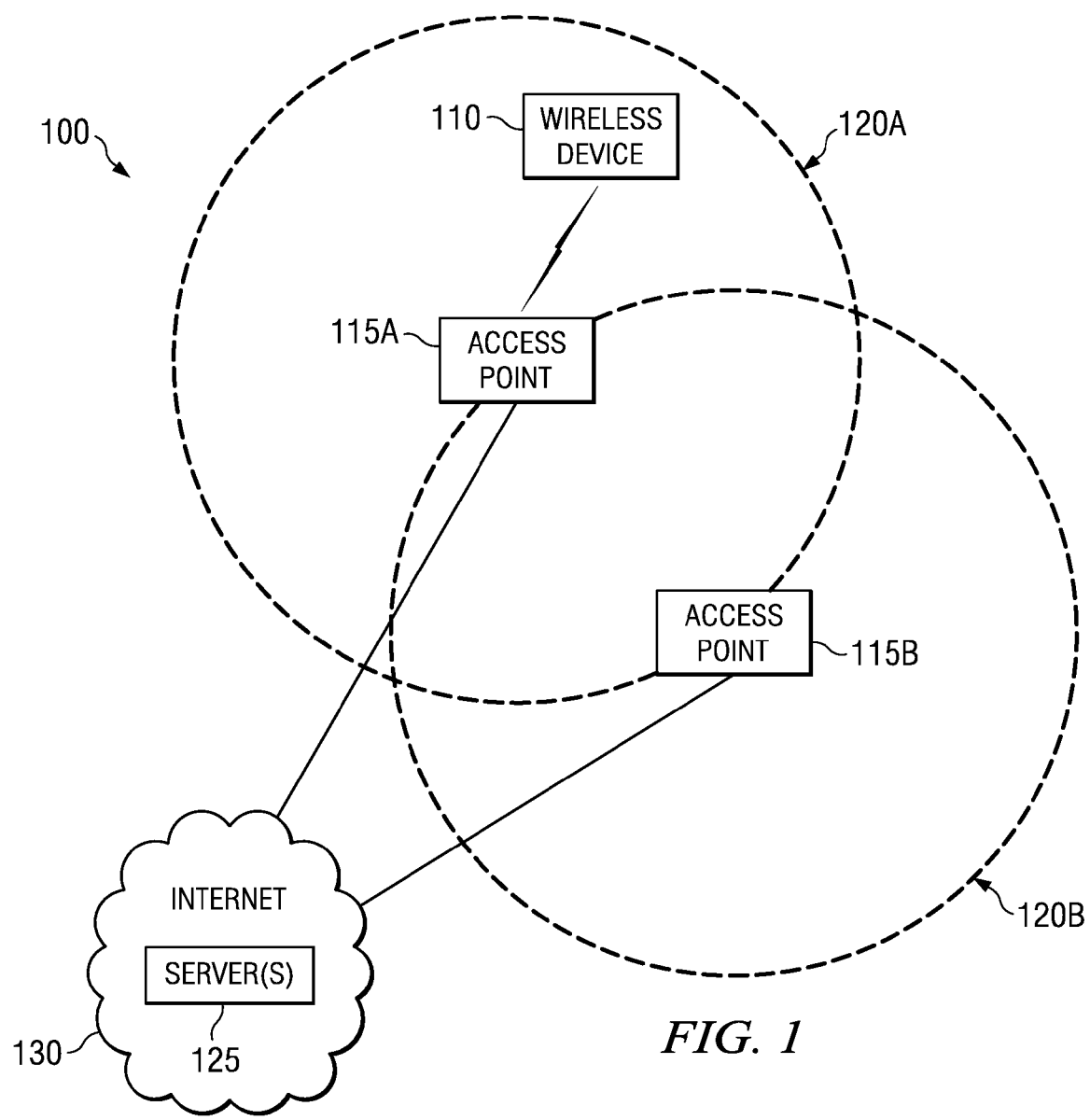
FIG. 1 is a diagram of an example wireless network that includes a WLAN device constructed in accordance with the teachings of this disclosure.

FIG. 1 illustrates an example wireless network 100 that includes any number and/or type(s) of fixed-location, substantially fixed-location and/or mobile wireless local area network (WLAN) devices, one of which is designated at reference numeral 110. Example mobile WLAN devices 110 include, but are not limited to, a personal digital assistant (PDA), an MP3 player such as an ipod®, a wireless telephone (e.g., a cellular phone, a voice over Internet Protocol (VoIP) phone, a smart phone, etc.), a laptop computer with wireless communication capabilities, etc. Example fixed-location or substantially fixed-location WLAN devices 110 include, for example, a desktop personal computer (PC) with wireless communication capabilities. An example manner of implementing the example WLAN device 110 is described below in connection with FIG. 2.

To provide wireless data and/or communication services (e.g., telephone services, Internet services, data services, messaging services, instant messaging services, electronic mail (email) services, chat services, video services, television services, audio services, gaming services, etc.) over a site, location, building, geographic area and/or geographic region, the example wireless network 100 of FIG. 1 includes any number and/or type(s) of access points, two of which are designated with reference numbers 115A and 115B. In some examples, the example access points 115A, 115B of FIG. 1 could be arranged in a pattern and/or grid with abutting and/or overlapping coverage areas 120A, 120B such that the WLAN device 110 located in, and/or moving through and/or within an area communicatively covered by the access points 115A, 115B can communicate with at least one of the access points 115A, 115B. However, access points do not need to be placed and/or arranged to provide coverage throughout all of an area. For example, there may be one or more locations where a WLAN-based communication service is not accessible by the example WLAN device 110.

The example WLAN device 110 and/or the example access points 115A, 115B of FIG. 1 are implemented in accordance with one or more past, present and/or future wired and/or wireless communication standards and/or specifications (e.g., one or more past, present and/or future standards from the Institute of Electrical and Electronics Engineers (IEEE) 802.11x family of standards, a.k.a. WiFi) and/or implement features from one or more of those standards and/or specifications. Moreover, the example WLAN device 110 and/or any of the example access points 115A, 115B may implement a similar and/or a different set, subset and/or combination of the IEEE 802.11x standards.

Depending upon the current location of the example WLAN device 110, the WLAN device 110 may receive a stronger and/or higher quality signal from one of the access points 115A, 115B than from the other(s) of the access points 115A, 115B. The signal strengths and/or qualities may be affected by the WLAN device's respective proximities and/or distances to the access points 115A, 115B. The signal strengths and/or signal qualities may also be affected by, for example, interference, and/or reflections of wireless signals by intervening objects. The signal strength and/or signal quality associated with a particular access point 115A, 115B may change as the WLAN device 110 moves through and/or within an area 120A, 120B covered by the access point 115A, 115B. As such, the example WLAN device 110 of FIG. 1 performs background and/or RSSI scans to identify and/or monitor for other access points 115A, 115B that may provide a stronger and/or higher quality signal. Additionally or alternatively, background and/or RSSI scanning may be performed by the WLAN device 110 to allow the position and/or location of the WLAN device 110 to be computed, estimated and/or otherwise determined. For example, the WLAN device 110 can be assumed to be closest to the access point 115A, 115B having the largest associated RSSI value. The RSSI values associated with multiple access points 115A, 115B can, additionally or alternatively, be used to calculate (e.g., triangulate) the position of the WLAN device 110.

An RSSI scan involves the reception and/or processing of a beacon signal and/or packet transmitted by a WLAN access point. A WLAN access point 115A, 115B transmits its beacon approximately every 100 milliseconds (ms). During detection and reception of a beacon, the WLAN device 110 can determine the current RSSI value associated with signals received from the access point. In addition to determining the RSSI value, the WLAN device 110 can demodulate and/or decode the contents of the beacon to identify, among other things: (a) the beacon interval in use by the access point (i.e., how often the access point will transmit its beacon), (b) the basic service set identifier (BSSID) assigned to the access point, and (c) the global time of the access point transmitting the beacon signal. The global time of the access point is typically provided in the beacon signal via the TSF_Timer parameter, as defined in the IEEE 802.11.x family of standards.

Using any number of method(s), logic and/or algorithm(s), the global time of an access point may be used by a WLAN device to synchronize the WLAN device's clock and/or time with the clock and/or time of the access point.

Figure 3A:
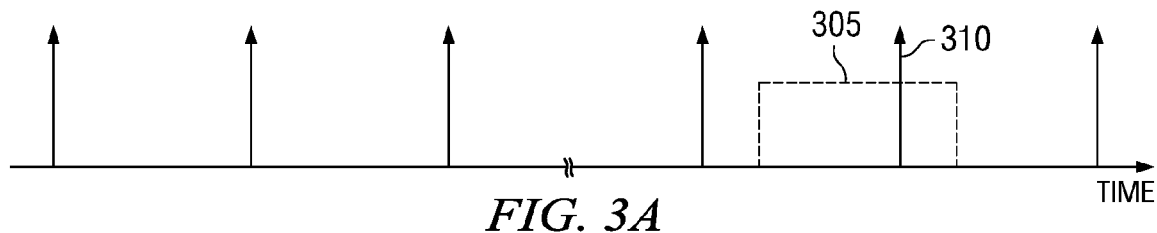
FIGS. 3A and 3B illustrate example operations of the example WLAN device of FIGS. 1 and/or 2.
Figure 3B:
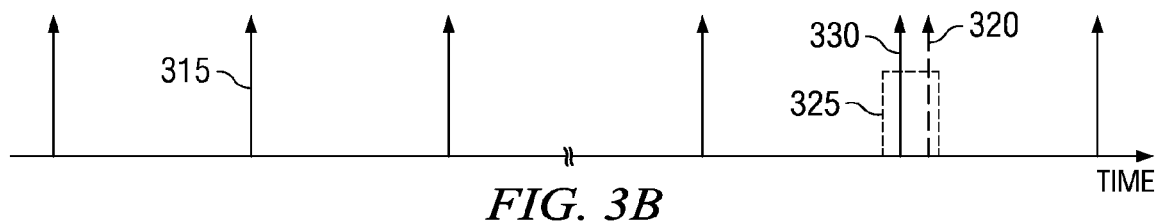

Traditional WLAN devices perform a full scan of all WLAN channels defined by the IEEE 802.11x family of standards. However, such brute-force WLAN channel scanning techniques can consume excessive and/or undesirable amounts of power. Traditionally, a WLAN device performs an RSSI scan by tuning its receiver to a particular WLAN channel at a random time 305 (FIG. 3A) and then waiting to receive a beacon 310 associated with the WLAN channel, if there is actually one present. In some examples, the receiver may enter a low-power state when the beacon 310 is received. As illustrated in FIG. 3A, the RSSI scan for each WLAN channel may take 100 ms (worst case) or 50 ms (typical), and a scan of all eleven of the defined 2.4 GHz WLAN channels may take 1.1 seconds (s) (worst case) or 550 ms (typical). While the illustrated examples of FIGS. 3A and 3B are described with reference to 2.4 GHz WLAN channels, they are equally applicable to the 5 GHz WLAN channels defined in the IEEE 802.11.x family of standards. To support a WiFi location service requiring a position fix and, thus, an RSSI scan every few seconds, a receiver of such a WLAN device needs to operate a substantial portion of the time (e.g., 30%), which may, in some circumstances, consume a WLAN device's battery in as little as 4 hours.

In contrast, in the illustrated example of FIG. 3B the example WLAN device 110 of FIG. 1 implements a fast scanning technique that reduces the time required to scan a particular WLAN channel from 50-to-100 ms to a few ms (e.g., three or four ms). The example WLAN device 110 of FIG. 1 reduces the time to perform an RSSI scan for a particular WLAN channel by using information obtained in a beacon 315 (FIG. 3B) to calculate and/or predict an upcoming beacon time 320, and then only enables and/or operates the receiver of the WLAN device 110 to perform an RSSI scan during a short time interval 325 (e.g., three or four ms in duration) that includes the calculated beacon time 320. As shown in FIG. 3B, the calculated beacon time 320 may be different than the actual beacon time 330, but the duration of the time interval 325 is selected to encompass any such differences.

To further reduce power consumption, the example WLAN device 110 of FIG. 1 may, additionally or alternatively, only scan a subset of the defined WLAN channels. For example, the WLAN device 110 can first scan only the most popular, commonly used and/or frequently used WLAN channels (e.g., channels 1, 6 and 11), and only scan less frequently used channels when a sufficient number (e.g., 1 or 2) of satisfactory RSSI values are not measured on the frequently used WLAN channels. By implementing such methods, the example WLAN device 110 of FIG. 1 can reduce power consumption due to background and/or RSSI scanning by more than a factor of fifty. Such power savings enable the use of WLAN-based location service without a significant impact on battery life. Additionally, the example methods described herein are compliant with the currently existing 802.11x family of standards, and may be implemented on many existing WLAN devices via firmware and/or software upgrades.

To allow the WLAN device 110 to communicate with devices and/or servers, the example access points 115A, 115B of FIG. 1 are communicatively coupled via any type(s) of communication paths to, for example, any number and/or type(s) of server(s) 125 associated with one or more public and/or private Internet Protocol (IP) based network(s) such as the Internet 130. The example server(s) 125 of FIG. 1 may be used to implement access control and/or to provide, receive and/or deliver, for example, any number and/or type(s) of data, video, audio, telephone, gaming, Internet, messaging and/or electronic mail services.

While this disclosure refers to the example wireless network 100, the example WLAN device 110 and/or the example access points 115A, 115B of FIG. 1, the example wireless network 100 of FIG. 1 may be used to provide services to, from and/or between any alternative and/or additional wired and/or wireless communication devices (e.g., telephone devices, personal digital assistants (PDA), laptops, etc.). Additionally, although for purposes of explanation, the descriptions contained herein refer to the example wireless network 100, the example WLAN device 110 and/or the example access points 115A, 115B illustrated in FIG. 1, any additional and/or alternative type(s) and/or number(s) of communication systems, communication devices and/or communication paths may be used to implement a wireless network and/or to provide data and/or communication services while still benefiting from the teachings of this disclosure. Moreover, while these descriptions reference the IEEE 802.11x family of standards, the methods and apparatus disclosed herein may be utilized for wireless networks operated in accordance with any past, present and/or future standard(s) and/or specification(s) such as, for example, the IEEE 802.16x (a.k.a. WiMax) family of standards.

Figure 2:
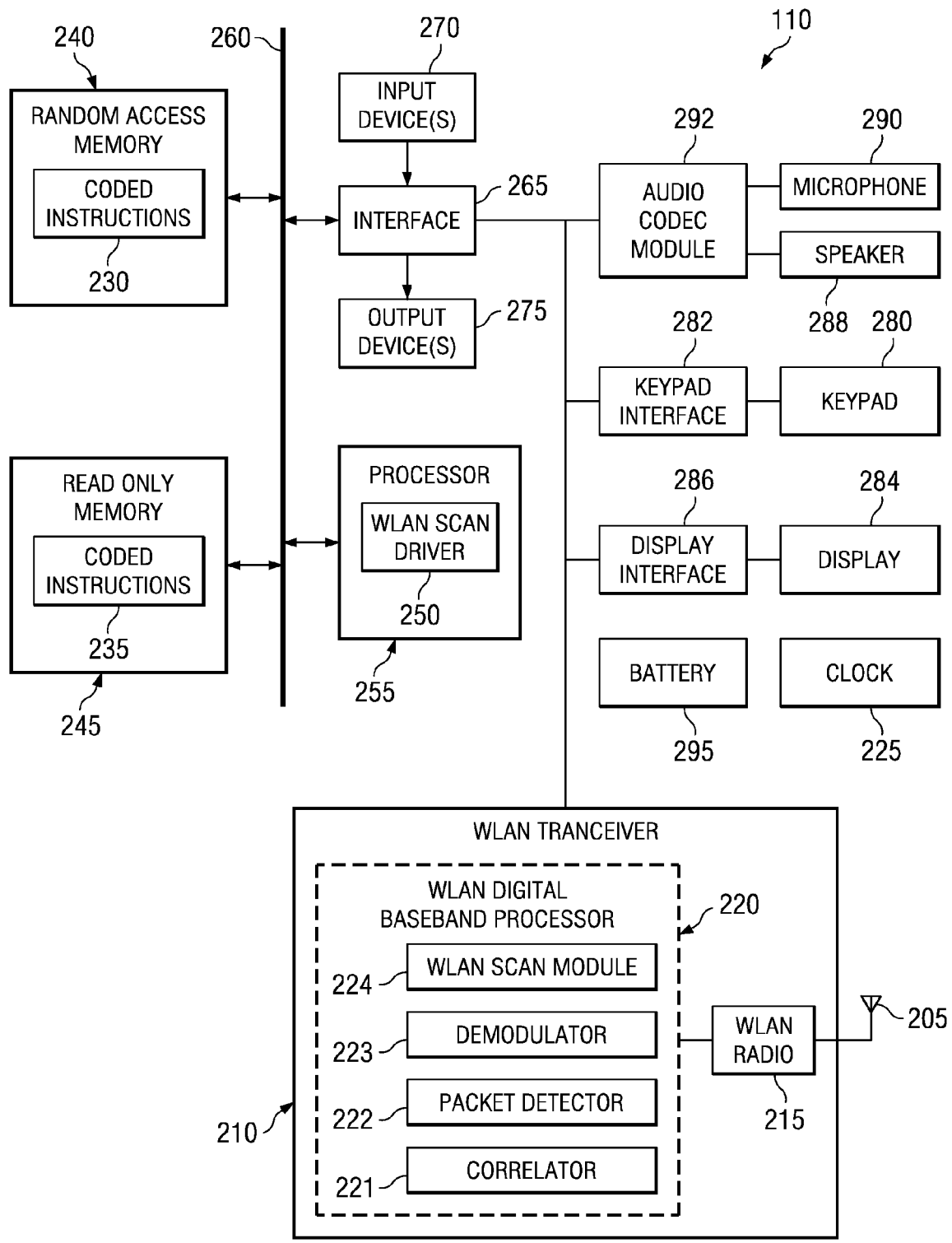
FIG. 2 illustrates an example manner of implementing the example WLAN device of FIG. 1.

FIG. 2 illustrates an example manner of implementing the example WLAN device 110 of FIG. 1. To implement wireless communications with the example access points 115A, 115B and/or one or more other wireless devices of the example wireless network 100 of FIG. 1, the example WLAN device 110 of FIG. 2 includes any number and/or type(s) of radio frequency (RF) antennas 205 and a WLAN transceiver 210. The example RF antenna 205 and the example WLAN transceiver 210 of FIG. 2 are able to receive, demodulate and decode WLAN signals transmitted to and/or within the example wireless network 100 of FIG. 1. Likewise, the WLAN transceiver 210 and the RF antenna 205 are able to encode, modulate and transmit WLAN signals from the example WLAN device 110 to any or all of the example access points 115A, 115B and/or the example wireless device(s) 110 of the example wireless network 100 of FIG. 1. As such, the WLAN transceiver 210 implements both a receiver and a transmitter. Thus, as commonly referred to in the industry, the example RF antenna 205 and the example WLAN transceiver 210 collectively implement the physical layer (a.k.a. PHY) for the example WLAN device 110 of FIG. 2.

To perform one or more of digital-to-analog conversions, analog-to-digital conversions, filtering, modulation and/or demodulation between baseband, intermediate and/or radio frequencies, amplification, etc., the example WLAN transceiver 210 of FIG. 2 includes any number and/or type(s) of WLAN modules, one of which is designated at reference numeral 215. The example WLAN module 215 of FIG. 1 includes a receiver and a transmitter (not shown). In the illustrated example of FIG. 2, the receiver and the transmitter of the WLAN radio 215 can be enabled and disabled independently.

To process WLAN digital baseband signals, the example WLAN transceiver includes a WLAN baseband processor 220. The example WLAN baseband processor 220 of FIG. 2 may be and/or include one or more of any type(s) of processors such as, for example, a microprocessor, a processor core, a microcontroller, a digital signal processor (DSP), an advanced reduced instruction set computing (RISC) machine (ARM) processor, etc. The example WLAN baseband processor 220 executes machine-accessible instructions 230 and/or 235, which may be present in a main memory of FIG. 2 (e.g., within a random-access memory (RAM) 240 and/or a read-only memory (ROM) 245) and/or within an on-board memory of the WLAN baseband processor 220. The example WLAN baseband processor 220 may execute, among other things, the example machine-accessible instructions illustrated in FIG. 4 to implement the fast and low-power RSSI scanning.

In addition to other processes, the example WLAN baseband processor 220 of FIG. 2 implements any number and/or type(s) of receiver modules including, but not limited to any number and/or type(s) of correlators (one of which is designated at reference numeral 221), any number and/or type(s) of packet detectors (one of which is designated at reference numeral 222), any number and/or type(s) of demodulators (one of which is designated at reference numeral 223), and a WLAN scan module 224. The example correlator 221, the example packet detector 222, and the example demodulator 223 of FIG. 2 operate in accordance with any past, present and/or future wireless standard and/or specification.

Collectively, the example antenna 205, the receiver of the example WLAN radio 215 and the example receiver modules 221-223 of the example WLAN digital baseband processor 220 implement a wireless receiver for the example WLAN device 110.

The example WLAN scan module 224 of FIG. 2 operates, controls and/or enables the WLAN radio 215, the example correlator 221, the example packet detector 222, the example demodulator 223 and/or any other parts of the WLAN transceiver 210 to perform fast and low-power RSSI scanning of WLAN channels. When a particular WLAN channel is to be scanned, the example WLAN scan module 224 of FIG. 4 calculates and/or predicts an upcoming beacon time 320 (FIG. 3B) for the WLAN channel. The WLAN scan module enables the WLAN radio 215, the correlator 221 and the packet detector 222 for a short time interval 325 (e.g., three to four ms in duration) that includes the calculated beacon time 320. The duration of the time interval 325 is kept as short as possible to reduce power consumption due to RSSI scanning while keeping it long enough to accommodate the anticipated ambiguity and/or difference between the calculated beacon time 320 and the actual beacon time 330. Because a real-time clock 225 of the WLAN device 110 may operate at a slightly different rate than the real-time clock of an access point (not shown), there may be some error and/or difference between when the access point actually transmits a beacon 330 and the beacon time 320 calculated and/or predicted by the WLAN scan module 224 (see FIG. 3B). Thus, the WLAN scan module 224 enables the WLAN radio 215, the correlator 221 and the packet detector 222 prior to the calculated beacon time 320. For example, a time period centered around the expected beacon time (e.g., encompassing 2 ms before and 2 ms after the expected beacon time) may be employed. In some examples, the duration of the RSSI scan interval 325 is selected to accommodate the maximum possible real-time clock difference between the WLAN device 110 and an access point (e.g., the time period is centered around the expected beacon time and lasts for two times the absolute value of a difference of the global time of the access point and the time of the WLAN device 110). Alternatively, the WLAN scan module 224 estimates the real-time clock rate difference and uses the same to reduce the duration of the RSSI scan time interval 325 and, thus, the power consumed by the WLAN device 110 to perform RSSI scanning. Further still, the duration of the RSSI scan time interval 325 can be adjusted based on a power consumption of the wireless receiver module. For example, given a desired battery life (e.g., 12 hours), given how often RSSI scanning is to be performed (e.g., every 3 seconds), and knowing the power consumption per unit of time of the WLAN device 110 to perform an RSSI scan, the length of the time interval 325 can be computed.

The example WLAN scan module 220 of FIG. 2 calculates an upcoming beacon time based on one or more of (a) the time at which a prior beacon was received, (b) the beacon interval specified in a previously received beacon, and/or (c) an estimate of the operating speed of the real-time clock 225 of the WLAN transceiver 210 and the real-time clock of the access point. In some examples, the operating speed difference between the two real-time clocks is computed, estimated and/or determined by comparing time stamps received in previous beacons with corresponding time stamps determined using the real-time clock 225 of the WLAN transceiver 210. The next beacon time may, for example, be computed by identifying the smallest integer n such that n*beacon-interval+last_beacon_time>current_time, where n*beacon_interval+last_beacon_time is the next upcoming beacon time. When real-time clock differences are compensated, the value of beacon_interval may be adjusted based on the difference in clock rates.

In some examples, the WLAN scan module 220 of FIG. 2 does not enable the example demodulator 223 during each RSSI scan, to further consume power. Instead, the WLAN scan module 220 assumes that the same access point that was associated with a previous beacon of the WLAN channel is still associated with the WLAN channel. When such an assumption is made, the presence of a packet, as detected by the example packet detector 222, provides a simple confirmation that the access point is still communicatively coupled with the WLAN transceiver 210 and that the RSSI value measured by the example correlator 221 can be associated with the access point. Periodically or aperiodically, the WLAN scan module 224 also enables the demodulator 223 to verify the identification of the access point and to obtain an updated access point timestamp.

Upon startup, the example WLAN scan module 224 of FIG. 2 performs a full RSSI scan of the available WLAN channels. After the initial full RSSI scan, the WLAN scan module 224 performs periodic or aperiodic full RSSI scans (e.g., every few minutes). In the intervals between full RSSI scanning, fast low-power RSSI scans (described above) are performed every few seconds on the active WLAN channels identified by the most recent full RSSI scan. To further reduce power consumption during full RSSI scans, the example WLAN scan module 224 only scans a subset of the defined WLAN channels. For example, the WLAN scan module 224 only scans the most popular, commonly used and/or frequently used WLAN channels (e.g., channels 1, 6 and 11), only scanning less frequently used channels when a sufficient number (e.g., 1 or 2) of satisfactory RSSI values are not measured on the frequently used WLAN channels. The most frequently used channels may be input to the WLAN transceiver 210 and/or may be adjusted over time by tracking channel usage and storing the same in memory.

To allow a location-based application and/or service to obtain WLAN-based location information (e.g., RSSI values) determined by the example WLAN scan module 224, the example WLAN device 110 of FIG. 2 includes a WLAN scan driver 250. In response to a query and/or request for WLAN-based location information, the example WLAN scan driver 250 of FIG. 2 queries the example WLAN scan module 224 to obtain recent RSSI values and reports the same to the requesting application and/or service.

To implement the example WLAN scan driver 250 using one or more of any number and/or type(s) of software, firmware, processing thread(s) and/or subroutine(s), the example WLAN device 110 of FIG. 2 includes a processor 255. The example processor 255 of FIG. 2 may be and/or include one or more of any type(s) of processors such as, for example, a microprocessor, a processor core, a microcontroller, a DSP, an ARM processor, etc. The example processor 255 executes coded instructions 230 and/or 235, which may be present in a main memory of FIG. 2 (e.g., within the example RAM 240 and/or the example ROM 245) and/or within an on-board memory of the processor 255.

While in the illustrated example of FIG. 2, the example correlator 221, the example packet detector 222, the example demodulator 223, the example WLAN scan module 224, and the example WLAN scan driver 250 are implemented by executing one or more type(s) of software, firmware, processing thread(s) and/or subroutine(s) with the example processor 220 and/or the example processor 255, the example WLAN transceiver, the example WLAN baseband processor 220, the example correlator 221, the example packet detector 222, the example demodulator 223, the example WLAN scan module 224, and the example WLAN scan driver 250 may be, additionally or alternatively, implemented using hardware, software, firmware and/or any combination of hardware, software and/or firmware. Thus, for example, any or the example WLAN transceiver 210, the example WLAN baseband processor 220, the example correlator 221, the example packet detector 222, the example demodulator 223, the example WLAN scan module 224, and the example WLAN scan driver 250 and/or, more generally, the example WLAN device 110 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example WLAN transceiver 210, the example WLAN baseband processor 220, the example correlator 221, the example packet detector 222, the example demodulator 223, the example WLAN scan module 224, and the example WLAN scan driver 250 and/or, more generally, the example WLAN device 110 are hereby expressly defined to include a tangible medium such as a memory, a digital versatile disc (DVD), a compact disc (CD), etc. storing the firmware and/or software.

The example processor 220 and/or the example processor 255 of FIG. 2 are in communication with the main memory (e.g., the RAM 240 and/or the ROM 245) via a bus 260. The example RAM 240 may be implemented by DRAM, SDRAM, and/or any other type of RAM device. The example ROM 245 may be implemented by flash memory and/or any other desired type of memory device. Access to the memories 240 and 245 is typically controlled by a memory controller (not shown). The RAM 240 may be used, for example, to store previous beacon times, beacon time intervals, access point time stamps, etc.

The example WLAN device 110 of FIG. 2 also includes any number and/or type(s) of interface circuits 265. The example interface circuit 265 of FIG. 2 may implement any number and/or type(s) of interfaces, such as external memory interface(s), serial port(s), general purpose input/output port (s), etc. Additionally or alternatively, the interface circuit 265 may communicatively couple the example WLAN transceiver 210 with the processor 255.

In the example of FIG. 2, any number and/or type(s) of input devices 270 and any number and/or type(s) of output devices 275 are connected to the interface circuit 265. To facilitate user inputs via any type of keypad 280, the example WLAN device 110 of FIG. 2 includes any type of keypad interface 282. The example keypad interface 282 of FIG. 2 electrically couples and/or translates electrical signals conveying key press information from the example keypad 280 to the example processor 255.

To provide output information to a user via any number and/or type(s) of displays 284, the example WLAN device 110 of FIG. 2 includes any number and/or type(s) of display interfaces 286. An example display interface 286 receives information (e.g., alphanumeric characters) to be displayed from the example processor 255 and creates electrical signals suitable for displaying the information on the example display 284. An example display 284 is a liquid-crystal display (LCD) screen.

To electrically couple signals (e.g., speech signals) between the example processor 255 and a speaker 288 and a microphone 290, the example WLAN device 110 of FIG. 2 includes any number and/or type(s) audio codec (coder/decoder) modules 292. An example audio codec module 292 implements any number and/or type(s) of filter(s), analog-to-digital converter(s) and/or digital-to-analog converter(s), audio encoding modules, audio decoding modules.

To provide power, the example WLAN device 110 of FIG. 2 includes any type of power supply, such as any type(s) of battery(-ies) 295, alternating current (AC) to direct current (DC) converter(s), and/or a DC-to-DC converter(s).

While an example manner of implementing the example WLAN device 100 of FIG. 1 is illustrated in FIG. 2, one or more of the interfaces, data structures, elements, processes and/or devices illustrated in FIG. 2 may be combined, divided, re-arranged, omitted, eliminated and/or implemented in any other way. Further, a WLAN device may include interfaces, data structures, elements, processes and/or devices instead of, or in addition to, those illustrated in FIG. 2 and/or may include more than one of any or all of the illustrated interfaces, data structures, elements, processes and/or devices. For example, a WLAN device may include one or more of an application processor, a power management module, a flash memory, a Bluetooth transceiver, a global positioning satellite (GPS) receiver, a WiMax transceiver, a camera, a television (TV) tuner, a universal serial bus (USB) interface, a vibrator, an FM radio receiver, etc.

Figure 4:
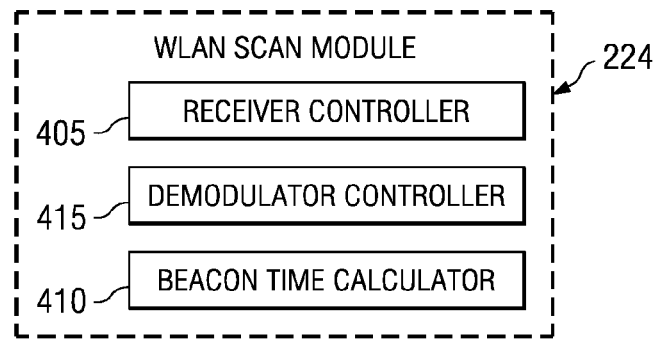
FIG. 4 illustrates an example manner of implementing the example WLAN scan module of FIG. 2.

FIG. 4 illustrates an example manner of implementing the example WLAN scan module 224 of FIG. 2. To enable and disable WLAN receiver functions of the WLAN radio 215, the example WLAN scan module 224 of FIG. 4 includes a receiver controller 405. Prior to an expected beacon time, the example receiver controller 405 of FIG. 4 enables the WLAN receiver of the WLAN radio 215, the example correlator 221 and the example packet detector 222.

To compute expected beacon times, the example WLAN scan module 224 of FIG. 4 includes a beacon time calculator 415. The example beacon time calculator 415 of FIG. 4 computes and/or estimates an upcoming beacon time based on one or more of (a) the time at which a prior beacon was received, (b) the beacon interval specified in a previously received beacon, and/or (c) an estimate of the operating speed of the real-time clock 225 of the WLAN transceiver 210 and the real-time clock of the access point that is to transmit the expected beacon.

To enable and disable demodulation functions of the WLAN radio 215, the example WLAN scan module 224 of FIG. 4 includes a demodulator controller 415. When a received beacon is to be decoded, the example demodulator controller 415 of FIG. 4 enables the example demodulator 222.

While an example manner of implementing the example WLAN scan module 224 of FIG. 2 is illustrated in FIG. 4, the WLAN scan module 224 may be implemented using any number and/or type(s) of alternative and/or additional processors, devices, components, circuits, modules, interfaces, etc. Further, one or more of the processors, devices, components, circuits, modules, elements, interfaces, etc. illustrated in FIG. 4 may be combined, re-arranged, eliminated and/or implemented in any other way. Additionally, the example receiver controller 405, the example beacon time calculator 410, the example demodulator controller 415 and/or, more generally, the example WLAN scan module 224 may be implemented as any combination of firmware, software, logic and/or hardware. Thus, for example, any or the example receiver controller 405, the example beacon time calculator 410, the example demodulator controller 415 and/or, more generally, the example WLAN scan module 224 may be implemented by one or more circuit(s), programmable processor(s), ASIC(s), PLD(s) and/or FPLD(s), etc. When any of the appended claims are read to cover a purely software and/or firmware implementation, at least one of the example receiver controller 405, the example beacon time calculator 410, the example demodulator controller 415 and/or, more generally, the example WLAN scan module 224 are hereby expressly defined to include a tangible medium such as a memory, a DVD, a CD, etc. storing the firmware and/or software. Moreover, a WLAN scan module may include processors, devices, components, circuits, interfaces and/or modules instead of and/or in addition to those illustrated in FIG. 4, and/or may include more than one of any or all of the illustrated processors, devices, components, circuits, interfaces and/or modules.

Figure 5:
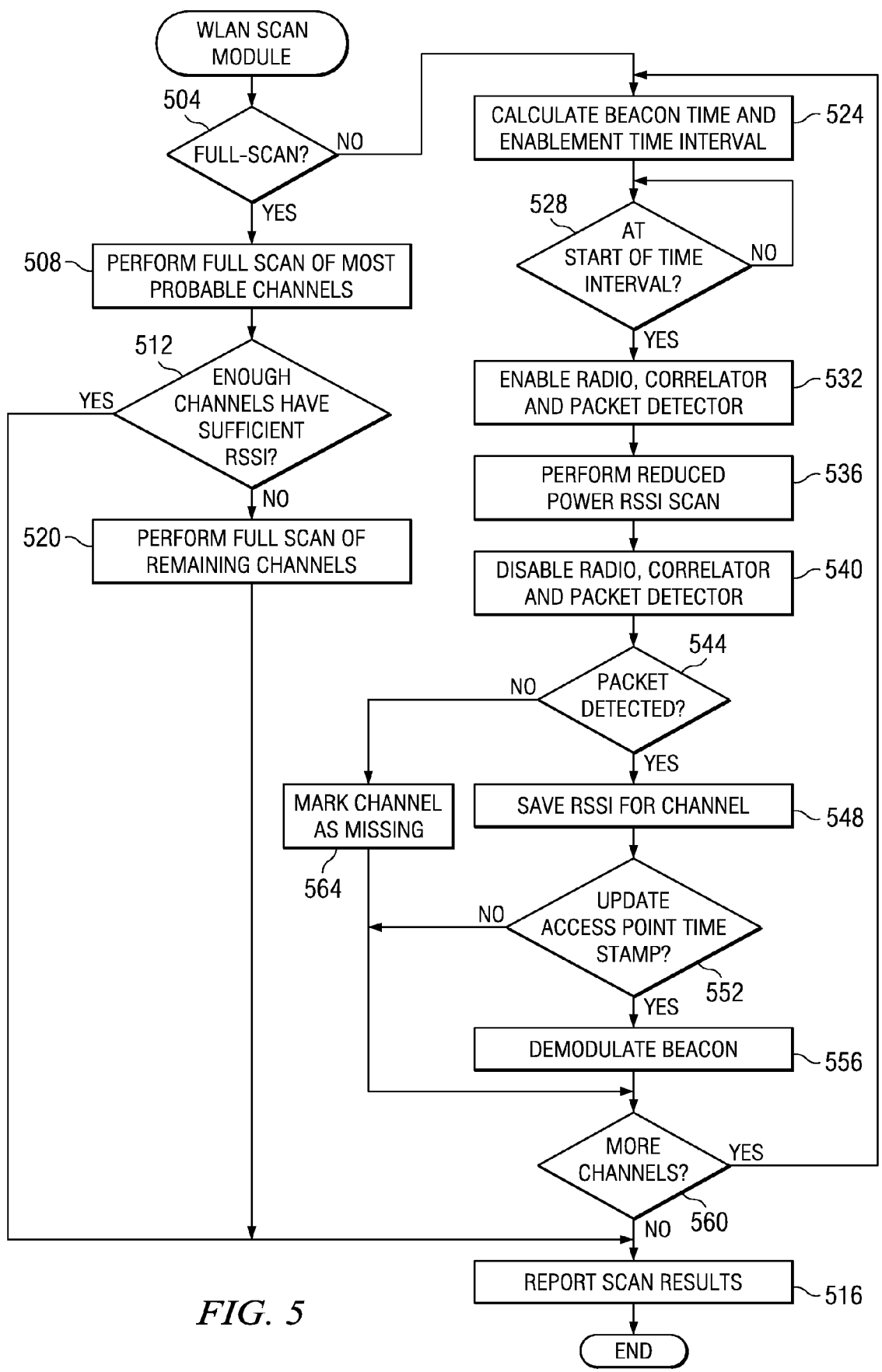
FIG. 5 is a flowchart representative of example machine accessible instructions that may be executed to implement the example WLAN scan module of FIG. 2 and/or, more generally, the example WLAN device of FIGS. 1 and/or 2.

FIG. 5 illustrates a flowchart representative of example machine-accessible instructions that may be executed to implement the example WLAN scan module 224 of FIG. 2 and/or, more generally, the example WLAN device 110 of FIG. 1. The example machine-accessible instructions of FIG. 5 may be carried out by a processor, a controller and/or any other suitable processing device. For example, the example machine-accessible instructions of FIG. 5 may be embodied in coded instructions stored on any tangible computer-readable medium such as a flash memory, a CD, a DVD, a floppy disk, a ROM, a RAM, a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-readable instructions or data structures, and which can be accessed by a processor, a general-purpose or special-purpose computer, or other machine with a processor (e.g., either or both of the example processors 220 and 255 of FIG. 2). Combinations of the above are also included within the scope of computer-readable media. Machine-readable instructions comprise, for example, instructions and/or data that cause a processor, a general-purpose computer, special-purpose computer, or a special-purpose processing machine to implement one or more particular processes. Alternatively, some or all of the example machine-accessible instructions of FIG. 5 may be implemented using any combination(s) of ASIC(s), PLD(s), FPLD(s), discrete logic, hardware, firmware, etc. Also, some or all of the example machine-accessible instructions of FIG. 5 may be implemented manually or as any combination of any of the foregoing techniques, for example, any combination of firmware, software, discrete logic and/or hardware. Further, many other methods of implementing the example operations of FIG. 5 may be employed. For example, the order of execution of the blocks may be changed, and/or one or more of the blocks described may be changed, eliminated, sub-divided, or combined. Additionally, any or all of the example machine-accessible instructions of FIG. 5 may be carried out sequentially and/or carried out in parallel by, for example, separate processing threads, processors, devices, discrete logic, circuits, etc.

The example machine-accessible instructions of FIG. 5 begin when the example WLAN scan driver 250 directs the example WLAN scan module 224 to perform a RSSI scan. The WLAN scan module 224 determines whether it is time to perform a full RSSI scan or a fast low-power RSSI scan (block 504). If it is time to perform a full RSSI scan (block 504), the example receiver controller 405 of FIG. 4 enables the receiver of the WLAN radio 215, the correlator 221 and the packet detector 222, and the example demodulator controller 415 enables the demodulator 223 to collectively perform a traditional and/or full RSSI scan for each of a set of frequently and/or commonly used WLAN channels (block 508). If a sufficient number (e.g., two) of the WLAN channels have an adequate RSSI value (e.g., the RSSI value exceeds a threshold) (block 512), the WLAN scan module 224 reports the determined RSSI values (block 516). Control then exits from the example machine-accessible instructions of FIG. 5.

Returning to block 512, if there are not a sufficient number of the frequently used WLAN channels with an adequate RSSI value (block 512), the example receiver controller 405 of FIG. 4 enables the receiver of the WLAN radio 215, the correlator 221 and the packet detector 222, and the example demodulator controller 415 enables the demodulator 223 to collectively perform a traditional and/or full RSSI scan on the less frequently and/or less commonly used WLAN channels (block 520). The WLAN scan module 224 reports the determined RSSI values (block 516), and control exits from the example machine-accessible instructions of FIG. 5.

Returning to block 504, if it is time to perform a fast and low-power RSSI scan (block 504), the example beacon time calculator 410 of FIG. 4 calculates the upcoming beacon time for a first WLAN channel and the start of a RSSI scan time interval that includes the calculated beacon time (block 524). The beacon time calculation at block 524 may be performed using the TSF_Timer parameter received in a previously received beacon message. The WLAN channel is selected from a list of channels stored in memory. The list of channels may include the active channel from a previous scan and/or the most probable and/or most often used channels (e.g., channels 1, 6 and 11 for the 2.4 Ghz band). When the start of the RSSI scan time interval arrives (block 528), the receiver controller 405 enables the receiver of the WLAN radio 215, the correlator 221, and the packet detector 222 to perform a fast low-power RSSI scan (block 532). The receiver of the WLAN radio 215, the correlator 221, and the packet detector 222 perform the scan (block 536), and the receiver controller 405 disables the WLAN radio 215, the correlator 221, and the packet detector 222 (block 540).

If the packet detector 222 detected the packet (block 544), the WLAN scan module 224 saves the RSSI values computed by the correlator 221 (block 548). If the beacon is to be decoded (e.g., when its parameters are indicated as visible in the beacon header fields) to, for example, update the time stamp of the access point (block 552), the demodulator controller 415 of FIG. 4 enables the demodulator 223 to demodulate some or all of the beacon (block 556). If there are more WLAN channels to be scanned (block 560), control returns to block 524 to calculate the beacon time for the next WLAN channel. If there are not more WLAN channels to be scanned (block 560), the WLAN scan module reports the RSSI scan results (block 516). Control then exits from the example machine-accessible instructions of FIG. 5.

Retuning to block 552, if the beacon is not to be decoded (block 552), control proceeds to block 560 without the demodulator controller 415 enabling the demodulator 223.

Returning to block 544, if a packet was not detected (block 544), the WLAN channel is marked as missing (block 564), and control proceeds to block 560 to check if more WLAN channels need to be scanned.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   performing a first received signal strength indicator (RSSI) scan to determine a beacon interval and a first beacon time for a wireless channel;
   calculating a second beacon time for the wireless channel based on the beacon interval and the first beacon time; and
   performing a second RSSI scan for the wireless channel during a time interval that includes the calculated second beacon time.

2. A method as defined in claim 1, further comprising determining a length of the time interval to accommodate a clock rate difference between a first clock associated with a wireless receiver module and a second clock associated with an access point associated with the wireless channel.

3. A method as defined in claim 1, further comprising determining a length of the time interval to accommodate an error in the calculation of the second beacon time.

4. A method as defined in claim 1, wherein a length of the time interval is less than about 4 milliseconds.

5. A method as defined in claim 1, wherein calculating the second beacon time comprises:
   determining a number of beacon intervals since the first beacon time;
   multiplying the number of beacon intervals and the beacon interval to form an elapsed time estimate;
   computing the second beacon time based on the elapsed time estimate.

6. A method as defined in claim 5, wherein computing the second beacon time comprises computing a sum of the elapsed time estimate and the first beacon time.

7. A method as defined in claim 5, further comprising using a local clock to estimate the number of beacon intervals since the first beacon time.

8. A method as defined in claim 1, disabling a packet demodulator of the wireless receiver module while performing the second RSSI scan.

9. A method as defined in claim 1, further comprising re-enabling a wireless receiver module to perform a third RSSI scan to determine a third beacon time for the wireless receiver.

10. A method as defined in claim 1, wherein the second RSSI scan is performed assuming the same access point is associated with the wireless channel during the first and second time intervals.

11. A method as defined in claim 1, further comprising determining a length of the time interval based on a power consumption of a wireless receiver module.

12. An apparatus comprising:
   a wireless receiver to perform received signal strength indicator (RSSI) scans;
   a receiver controller to enable the wireless receiver during a first time interval to perform a first RSSI scan for a wireless channel to determine a beacon interval and a first beacon time for the wireless channel, and to enable the wireless receiver during a second time interval that includes a calculated second beacon time to perform a second RSSI scan for the wireless channel to determine an RSSI value associated with the wireless channel; and
   a beacon time calculator to calculate the second beacon time based on the first beacon time and the beacon interval.

13. An apparatus as defined in claim 12, further comprising a demodulator controller to enable a demodulator of the wireless receiver during the first time interval and not enable the demodulator during the second time interval.

14. An apparatus as defined in claim 12, wherein the beacon time calculator is to determine a length of the second time interval to accommodate a clock rate difference between a first clock associated with a wireless receiver module and a second clock associated with an access point associated with the wireless channel.

15. An apparatus as defined in claim 12, wherein the wireless receiver is to determine the RSSI value without determining whether the same access point is associated with the wireless channel during the first and second time intervals.

16. An apparatus as defined in claim 12, wherein the wireless receiver is implemented in accordance with a standard from the Institute of Electrical and Electronics Engineer (IEEE) 802.1 1x family of standards.

17. An article of manufacture storing machine accessible instructions which, when executed, cause a machine to:
   perform a first received signal strength indicator (RSSI) scan to determine a beacon interval and a first beacon time for a wireless channel;

calculate a second beacon time for the wireless channel based on the beacon interval and the first beacon time; and perform a second RSSI scan for the wireless channel during a time interval that includes the calculated second beacon time.

18. An article of manufacture as defined in claim 17, wherein the machine accessible instructions, when executed, cause the machine to determine a length of the time interval to accommodate a clock rate difference between a first clock associated with a wireless receiver module and a second clock associated with an access point associated with the wireless channel.

19. An article of manufacture as defined in claim 17, wherein the machine accessible instructions, when executed, cause the machine to calculate the second beacon time by:
   determining a number of beacon intervals since the first beacon time;
   multiplying the number of beacon intervals and the beacon interval to form an elapsed time estimate;
   computing the second beacon time based on the elapsed time estimate.

20. An article of manufacture as defined in claim 17, wherein the machine accessible instructions, when executed, cause the machine to disable a packet demodulator of a wireless receiver module while performing the second RSSI scan.

* * * * *